United States Patent Office 3,635,968
Patented Jan. 18, 1972

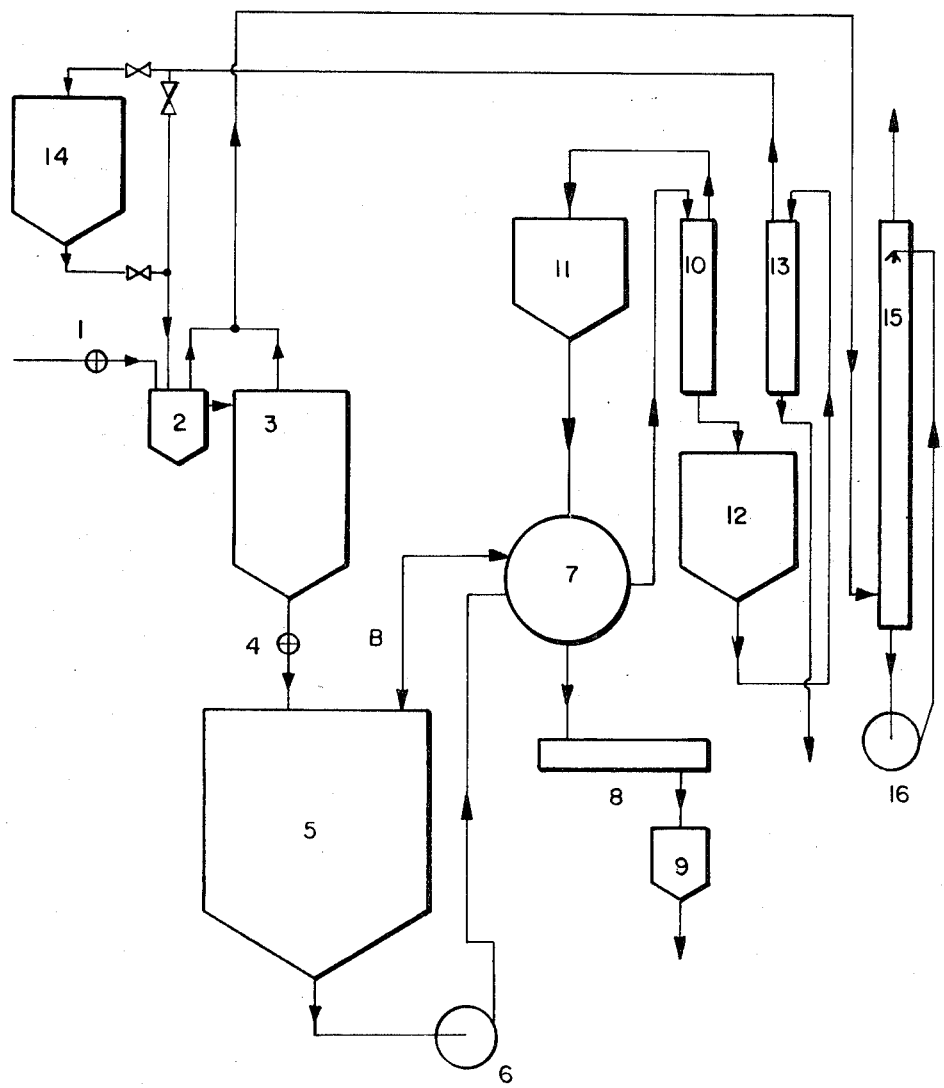

3,635,968
PRODUCTION OF CYANURIC ACID
Horst Goelz, Schwetzingen, Hubert Suter and Klaus Juergen Fust, Ludwigshafen, and Walter Himmele, Walldorf, Germany, assignors to Badische Anilin- & Soda-Fabrik Aktiengesellschaft, Ludwigshafen (Rhine), Germany
Filed July 9, 1969, Ser. No. 840,247
Claims priority, application Germany, July 9, 1968,
P 17 70 827.9
Int. Cl. C07d 55/36
U.S. Cl. 260—248 A                 5 Claims

ABSTRACT OF THE DISCLOSURE

Production of cyanuric acid from urea and/or biuret at elevated temperature using an unsubstituted or substituted N-cyclohexylpyrrolidone as solvent.

---

The present invention relates to an improved process for the production of cyanuric acid from urea.

It is known from U.S. patent specification No. 3,164,591 that cyanuric acid can be prepared by heating urea and/or biuret in N-methylpyrrolidone. Cyanuric acid is however only obtained in a yield of 70% according to this method. Moreover the acid obtained is not sufficiently pure where high purity is required, for example for the conversion into chlorinated secondary products, so that it has to be subjected to a further purification operation.

It is an object of this invention to improve the said method of making cyanuric acid from urea or biuret by heating in a solvent.

We have found that this object is achieved by using as the solvent an unsubstituted or substituted N-cyclohexylpyrrolidone and maintaining a reaction temperature of from 190° C. to 300° C.

Cyanuric acid is obtained in a degree of purity of almost 100% in yields of up to 98% according to the new process. The acid obtained can therefore be used without further purification for known applications, for example for conversion into secondary products such as trichloroisocyanuric acid or tris-2-hydroxyethyl cyanurate. Urea and solvent are advantageously used in a ratio by weight of 1:20 to 3:1, preferably 1:4 to 2.5:1 and particularly 1:1 to 2:1. It is surprising that particularly good results are obtained in the ratio by weight of urea to solvent of 1:4 because it is known from U.S. patent specification No. 3,297,697 that it is preferred to use a ratio by weight of urea to solvent of not more than 1:4. A very good space-time yield is obtained by the process according to the invention due to the favorable ratio of urea to solvent.

In addition to N-cyclohexylpyrrolidone (which it is preferred to use), use may be made as solvents for the process according to this invention of N-cyclohexylpyrrolidones having inert substituents such as alkyl groups having one to six carbon atoms or alkoxy groups having one to four carbon atoms. Examples of suitable N-cyclohexylpyrrolidones are N-cyclohexyl-4,4-dimethylpyrrolidone and N-3'-methylcyclohexylpyrrolidone.

The process according to the invention may be carried out batchwise or continuously. The process is very economical, particularly when carried out continuously, because only short residence time, for example twenty to sixty minutes, are required for the conversion of urea, and afterreaction, for example in another reactor, can be dispensed with. The reaction is carried out at a temperature of from 190° to 300° C., preferably from 210° to 280° C.

Atmospheric pressure is generally used in the process according to this invention. It is possible however to use subatmospheric pressure, for example from 50 to 750 mm., advantageously when it is desired to facilitate the escape from the reaction mixture of the ammonia formed in the reaction. Another possibility for removing ammonia from the reaction mixture consists in passing an inert gas, for example nitrogen or carbon dioxide, through the reaction mixture.

An advantageous embodiment of the process according to the invention consists in passing into the reaction mixture during the reaction hydrogen chloride, hydrogen sulfide, hydrogen and/or phosgene mixed with the said inert gas, the said gases being advantageously used in amounts of from 0.001 to 20, preferably from 0.05 to 0.6, parts by volume (STP) per part by volume of solvent per hour. A particularly coarse-grained cyanuric acid is obtained by this method and it exhibits a remission value of 95.3 (magnesium oxide=100) in the white test according to U.S. patent specification No. 3,357,979. It is known from the said specification that a cyanuric acid having a light reflectance value of about 95 is obtained only after expensive purification of crude cyanuric acid.

The reaction mixture may be worked up for example by separating the deposited cyanuric acid, for example by suction filtration or centrifuging, from the reaction mixture after cooling and if necessary after dilution with a solvent, advantageously of low boiling point, for example a solvent having a boiling point between about 50° and 150° C., and then washing it with the solvent. The ratio by weight of the reaction mixture to the solvent used for dilution is generally from 1:1 to 10:1.

Solvents which may be used in the working up are for example alcohols, ethers, amides, nitriles, aliphatic hydrocarbons, aromatic hydrocarbons and halogenated aliphatic or aromatic hydrocarbons. Specfiic examples are: methanol, ethanol, isobutanol, methylglycol, dioxane, dimethylformamide, acetonitrile, benzene, and trichloroethylene, methanol being preferred. The solvent is advantageously recovered from the combined filtrates, for example by distillation, and may be used again for the reaction.

The invention is illustrated by the following examples.

EXAMPLE 1

130.0 g. of urea is added in small portions within thirty minutes at atmospheric pressure and 240° C. to 180 g. of N-cyclohexylpyrrolidone in a stirred apparatus having a capacity of 1 liter and a stream of nitrogen is passed through the reaction mixture during the addition. The reaction mixture is then cooled to 30° C. and the deposited cyanuric acid is suction filtered on a glass suction filter, washed with 500 ml. of methanol and dried at 100° C. to 88.7 g. (95.1% of the theory) of cyanuric acid having a purity of practically 100% and a reflectance of 90.1 (with reference to magnesium oxide=100) is obtained.

EXAMPLE 2

2596 g. of urea is supplied through a metering feed hopper to 1800 g. of N-cyclohexylpyrrolidone at atmospheric pressure and 225° C. during 230 minutes in a stirred apparatus having a capacity of 4 liters, 0.2 liter per hour of hydrogen chloride gas being passed into the reaction mixture during the addition. The feed hopper is controlled by way of a contact thermometer during the addition of the urea so that the reaction temperature is maintained fairly accurately. The reaction mixture is worked up as described in Example 1. 1840 g. (98.9% of the theory) of cyanuric acid is obtained having a purity of practically 100% and a reflectance of 95.3.

EXAMPLE 3

Parts given in Example 3 are parts by weight; they bear the same relation to parts by volume as the gram to the liter.

Referring to the accompanying drawing, 300 parts of N-cyclohexylpyrrolidone at a temperature of 225° C. is present in a mixing unit 2 and another 600 parts in a reactor 3. 500 parts per hour of urea (supplied through a metering means 1) and 500 parts per hour of N-cyclohexylpyrrolidone from a storage tank 14 are mixed in the mixing unit 2 at 225° C. The reaction mixture obtained in 2 is fed into the reactor 3 in which a temperature of 225° C. is also maintained. The reaction mixture obtained is conveyed from the reactor by a rotary valve 4 from the bottom into a cooling container 5 below the same and is mixed with washing methanol (B) obtained from the centrifuge 7. The mixture cooled to 30° to 50° C. mainly by evaporative cooling is conveyed by a pump 6 to the centrifuge 7 in which the solvent mixture (A) is separated from the crude cyanuric acid. The crude cyanuric acid obtained is washed with 900 parts per hour of pure methanol from the reservoir 11. The washed cyanuric acid is then dried at 100° C. in a dryer 8. 345 parts per hour of cyanuric acid (96% of the theory) is obtained in a purity of practically 100%. The space-time yield is 230 parts of cyanuric acid per part by volume per hour.

The solvent mixture (A), which consists mainly of methanol and N-cyclohexylpyrrolidone, is separated in a distillation column 10, the methanol being returned to the reservoir 11 and the N-cyclohexylpyrrolidone being passed through an intermediate-storage vessel 12 into the finishing column 13. Pressure in the column 13 is chosen so that the distillate is obtained at the temperature maintained in the mixing unit 2 so that it can immediately be supplied thereto.

The offgas from the vessels 2 and 3 which consists substantially of ammonia, a little carbon dioxide and entrained solvent, is passed into a countercurrent absorber 15 and washed in a water recycle 16. Solvent residues and ammonium carbonate are thus withdrawn from the offgas. Pure ammonia is recovered from the saturated aqueous ammonia solution and can be used for another process.

We claim:

1. A process for the production of cyanuric acid from a member selected from the group consisting of urea, biuret, and mixtures thereof at elevated temperature using solvents wherein an unsubstituted or substituted N-cyclohexylpyrrolidone, said substituted N-cyclohexylpyrrolidone being substituted with substituents selected from the group consisting of alkyl of one to six carbon atoms and alkoxy of one to four carbon atoms, is used as the solvent and a reaction temperature of from 190° to 300° C. is maintained.

2. A process as in claim 1 wherein a member selected from the group consisting of hydrogen chloride, hydrogen sulfide, hydrogen and phosgene is passed into the reaction mixture during the reaction.

3. A process as in claim 2 wherein the said substances are passed in mixed with an inert gas.

4. A process as in claim 1 carried out at from 210° to 280° C.

5. A process as in claim 1, carried out at a subatmospheric pressure of from 50 to 750 mm.

References Cited

UNITED STATES PATENTS 3,164,591    1/1965    Walles et al. _____ 260—248

JOHN M. FORD, Primary Examiner